US006783396B1

(12) United States Patent
Osterhart et al.

(10) Patent No.: US 6,783,396 B1
(45) Date of Patent: Aug. 31, 2004

(54) AIRTIGHT PLUG CONNECTOR AND TERMINAL INSERT

(75) Inventors: Michael P. Osterhart, Milford, MI (US); Vijay Keshavamurthy, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 10/400,836

(22) Filed: Mar. 27, 2003

(51) Int. Cl.[7] .............................................. H01R 13/40
(52) U.S. Cl. ..................................................... 439/587
(58) Field of Search ................................. 439/587, 148, 439/936, 588, 589, 352, 357, 358, 275, 279, 489

(56) References Cited

U.S. PATENT DOCUMENTS

| | | | | |
|---|---|---|---|---|
| 4,629,269 A | * | 12/1986 | Kailus ........................ 439/587 |
| 4,921,437 A | * | 5/1990 | Cooper et al. .............. 439/275 |
| 4,993,964 A | * | 2/1991 | Trummer .................... 439/272 |
| 5,066,252 A | | 11/1991 | Kato et al. |
| 5,167,534 A | * | 12/1992 | Ohsumi ...................... 439/595 |
| 5,252,096 A | * | 10/1993 | Okada ......................... 439/752 |
| 5,257,951 A | | 11/1993 | Maeda |
| 5,433,628 A | | 7/1995 | Sadaishi et al. |
| 5,454,737 A | | 10/1995 | Saba |
| 5,522,730 A | * | 6/1996 | Soes et al. .................. 439/78 |
| 5,645,455 A | | 7/1997 | Seki |
| 5,860,822 A | * | 1/1999 | Nishide et al. ............. 439/206 |
| 5,967,809 A | * | 10/1999 | Fink et al. .................. 439/157 |
| 5,984,721 A | | 11/1999 | Self, Jr. et al. |
| 6,318,991 B1 | * | 11/2001 | Kawase ....................... 425/556 |
| 6,371,818 B1 | * | 4/2002 | Saito et al. ................. 439/752 |
| 6,383,021 B1 | * | 5/2002 | Murakami et al. .......... 439/587 |
| 6,475,004 B2 | * | 11/2002 | Shuey et al. ................ 439/157 |

FOREIGN PATENT DOCUMENTS

JP          2000-306644        11/2000

* cited by examiner

*Primary Examiner*—Ross Gushi
*Assistant Examiner*—Phuongchi Nguyen
(74) *Attorney, Agent, or Firm*—Young & Basile, P.C.

(57) ABSTRACT

A vehicle wire harness type connector for making an electrical connection between terminated wire sets through the wall of a sealed chamber in airtight fashion. The connector includes an internal bulkhead with solid male terminals passing through the bulkhead with an airtight seal, and an exterior airtight seal to the ambient or external side of the wall of the sealed chamber. The end of the connector inserted in the sealed chamber is adapted to receive individual female-terminated wires in direct connection with the male terminals, and the ambient or external end of the connector is adapted to receive a group of female terminals housed in a mating connector. An orthogonal locking member is stored in the end of the connector inserted in the sealed chamber in a pre-lock position allowing the individual female terminals to be inserted, and is movable thereafter to a full-lock position to prevent their withdrawal. The bulkhead-embedded portions of the male terminals are provided with sealant accumulating surfaces to improve their airtight seal to the bulkhead.

13 Claims, 5 Drawing Sheets

AIRTIGHT PLUG CONNECTOR AND TERMINAL INSERT

FIELD OF THE INVENTION

The present invention is in the field of wire harness type electrical connectors used in automotive electrical systems to connect one set of terminated wires to another through a sealed partition or wall.

BACKGROUND OF THE INVENTION

Terminated wires in automotive electrical systems are commonly connected using plug-type connectors where a first set of wires is terminated in one connector housing, and a second set of wires is terminated in a mating connector housing, the two connectors mating in male-female fashion to bring the sets of wires into secure electrical connection inside the housings. Various locking mechanisms are used to keep the terminals locked securely in their respective connectors, and/or to keep the mated connectors locked together.

There are situations in automotive electrical systems where terminated wires must be connected across a watertight or airtight wall or barrier. For watertight connections one or both of the connectors and their wires/terminals may be provided with gaskets, seals, and waterproofing compounds to prevent leaks around the connectors, and to prevent leaks through the connectors around the wires and terminals. However, in situations calling for an airtight seal across a pressure differential it is known that electrical wires can convey air along their lengths between their insulation and conductor layers. Over time this can reduce or eliminate the vacuum or pressure differential.

One approach to preventing air leaks through the wires has been to connect the terminated wires on each side of the wall to the ends of solid metal terminals that pass through the wall in sealed fashion. This is typically accomplished with a three-part "relay" connector system. A double-ended relay connector is mounted with an airtight seal to the wall separating the pressure differential, for example using a gasket. The relay connector is internally divided and sealed with a partition or bulkhead through which the solid terminals pass in airtight fashion. Once mounted in the wall separating the pressure differential, the relay connector is able to receive mating terminated-wire connectors at both ends.

One method for mounting the solid terminals in the relay connector's bulkhead is to insert-mold them into the bulkhead as the plastic relay connector housing is formed. To ensure that the terminals are well-sealed, their bulkhead-embedded middle portions are sometimes coated with a sealant material prior to the molding operation. Another sealing technique leaves pockets or recesses in the bulkhead where the embedded portions of the terminals exit the bulkhead so that a sealant can be forced into the pockets after the molding process, for example by centrifuging.

The embedded, sealed terminals in the bulkhead connector are typically male terminals, and the mating connectors accordingly contain sets of female-terminated wires that plug into the embedded male terminals. The resulting electrical connection through the relay connector is intended to be both water- and air-tight.

A problem with the above-described method of sealing the embedded terminals is that the sealant forced into the terminal pockets can be driven through small gaps left by the molding process between the plastic bulkhead and the embedded metal of the terminals, leaving the gaps unsealed.

A problem with the three-part relay connector arrangement is its need for connector mating and locking structure on both sides of the relay connector. This is suitable where access can be freely had to both sides of the wall in which the relay connector is mounted, and where wire harnesses with connector housings are located on both sides of the wall. But in cases where access is difficult or no wire harness exists, for example where an electrical connection needs to be made directly to an electrical device in a sealed chamber such as the vacuum chamber of a brake booster, the three-part relay connector system is not as desirable. For example, the typical connector-locking structure on the exterior of the mating and relay connectors is not usually designed for insertion through the same aperture. And although the problem of retaining or locking individual terminated wires in a connector housing is often resolved with internal terminal-locking structure, the sealed, partitioned nature of a relay-type bulkhead connector does not lend itself to conventional terminal-locking structure, as such structure is difficult to seal.

BRIEF SUMMARY OF THE INVENTION

The present invention is a two-part connector system in which a sealed, relay-type bulkhead connector makes an airtight electrical connection through the wall of a sealed pressure vessel or chamber by securely accepting and retaining unsealed female-terminated wires on the sealed chamber side, and mating them through embedded male terminals with a mating female connector on the ambient side of the chamber.

The bulkhead connector has an ambient connector end for receiving a mating female-terminal connector in conventional fashion, and an external airtight seal to the ambient side of the sealed chamber wall. The other end of the bulkhead connector is designed to directly receive individual female-terminated wires and to be inserted through an aperture in the wall into the sealed chamber. A terminal locking member is inserted orthogonally into the chamber end of the connector to lock the female-terminated wires in place on their respective embedded male terminals.

The lack of a sealable mating connector on the chamber-side makes the seal between the bulkhead connector's partition and the embedded relay terminals extremely important, and the invention further includes a structure for improving the manner in which a sealant is used to ensure an airtight seal around the embedded portions of the molded-in terminals.

These and other features and advantages of the invention will become apparent upon a further reading of the specification in light of the accompanying drawings.

DETAILED DESCRIPTION OF THE INVENTION

Figure 1:
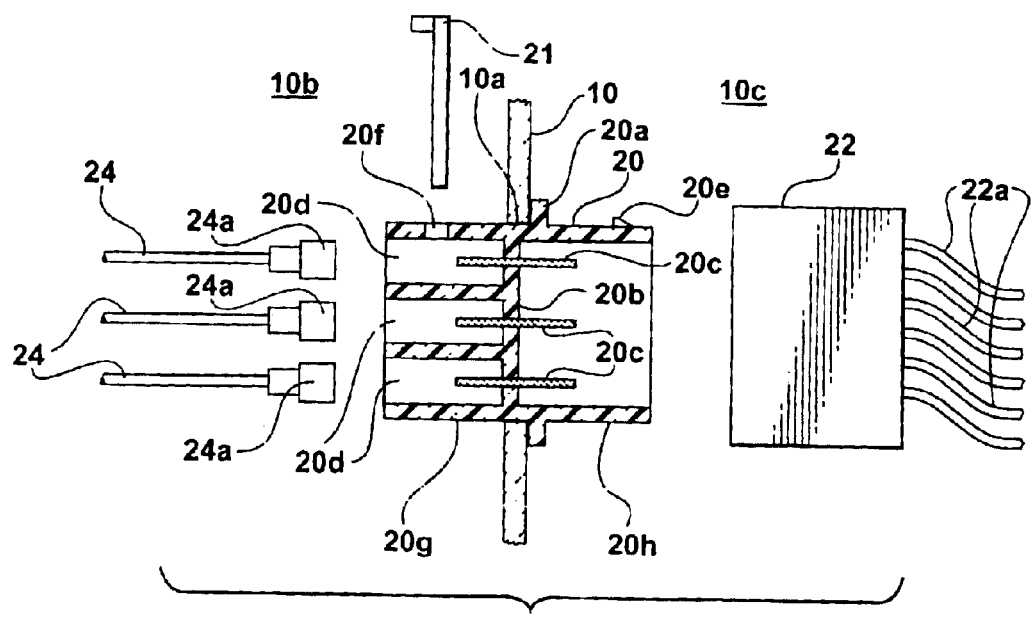
FIG. 1 is a schematic representation, in partially sectioned side elevation view, of a connector system according to the invention.

FIG. 1 is a schematic representation of a connector system for establishing an airtight electrical connection through the wall of a sealed pressure vessel or chamber in a vehicle, using vehicle-type wire harness connectors. A wall 10 represents the sealed chamber or vessel, for example an exterior wall of a brake booster vacuum chamber of known type. Wall 10 maintains a pressure differential between vacuum side 10b and ambient side 10c. It will be recognized by those skilled in the art of automotive wiring that although a vacuum/atmosphere differential is described in the illustrated example, the schematic of FIG. 1 represents any sealed pressure differential across which an airtight, vehicle-type wire harness connection might be made where air leaking through the wires is a concern.

A relay type bulkhead connector 20 is removably mounted to wall 10 through opening 10a with an airtight exterior seal to the ambient side of the wall. In the illustrated embodiment of FIG. 1 this airtight exterior seal is schematically illustrated by an annular shoulder portion 20a of the connector body, sealed to wall 10, for example with a gasket. Air cannot pass around connector 20 to degrade the pressure differential maintained by wall 10.

Connector 20 is internally divided and sealed by a bulkhead 20b, for example formed as an integral molded portion of the plastic-bodied connector. To eliminate the potential for air leakage through connector 20 via wires passing through bulkhead 20b, bulkhead 20b is electrically crossed in airtight fashion by one or more solid metal terminals 20c. Terminals 20c are male-ended terminals adapted to receive female-terminated wires on both sides of connector bulkhead 20b.

On ambient side 10c, connector 20 is adapted to receive female-terminated wires in the form of a conventional automotive-type wire harness connector 22. Female connector 22 contains a plurality of female-terminated wires 22a adapted to be mated with the ambient-side ends of terminals 20c. In conventional fashion, wires 22a are lockingly secured in connector 22, for example with axial locking structure formed in the connector's terminal chambers, and connector 22 is itself lockingly secured to connector 20 with locking structure such as that schematically shown at 20e. Connector 22 may also be sealed, both as to its body-to-body connection with connector 20, and as to its body-to-wire connection with the terminated wires.

Insertion end 102g of connector 20 is designed to receive individual, unsealed, female-terminated wires 24 in each of several terminal chambers 20d aligned with male terminals 20c. Insulated wires 24 are each terminated with a female metal terminal 24a of known type, designed to mate with the male ends of embedded terminals 20c. However, in order to minimize potential air leaks through the bulkhead connector, and to permit an airtight plug-in connection into the vacuum side 10b through wall 10 and aperture 10a, the insertion end 102g of connector 20 does not have the usual internal, axial terminal locking structure and external connector-locking structure that would normally ensure the security of the connection between wires 24 and embedded terminals 20c.

Terminated wires 24 are connected to their respective terminals 20c on the outside of the sealed chamber, and then the end 20g of connector 20 is inserted into aperture 10a until the locking collar/gasket abuts wall 10. Wires 24 are also secured to terminals 20c in their respective chambers 20d prior to inserting connector 20 into aperture 10a, using an orthogonal locking member 21 inserted through a passage 20f formed in the connector body behind the junction of the mated terminals in chambers 20d. Locking member 21 has a pre-lock condition in which it is partially inserted in passage 20f yet permits terminals 24a to be mated with terminals 20c, and a locked condition in which further insertion places portions of the locking member behind mated terminals 24a to prevent their rearward movement or withdrawal. Locking member 21 in the locked condition is recessed into the insertion end 20g of connector 20.

Locking member 21 provides a wall-insertable, unsealed, direct mechanical lock for terminals 24a inside connector 20 on the vacuum side 10b of the sealed chamber (and on the vacuum side of bulkhead 20b). The lock is accordingly independent of the external seal between shoulder portion 20a and wall 10, and of the internal seal between bulkhead 20b and the embedded portions of terminals 20c.

Figure 2:
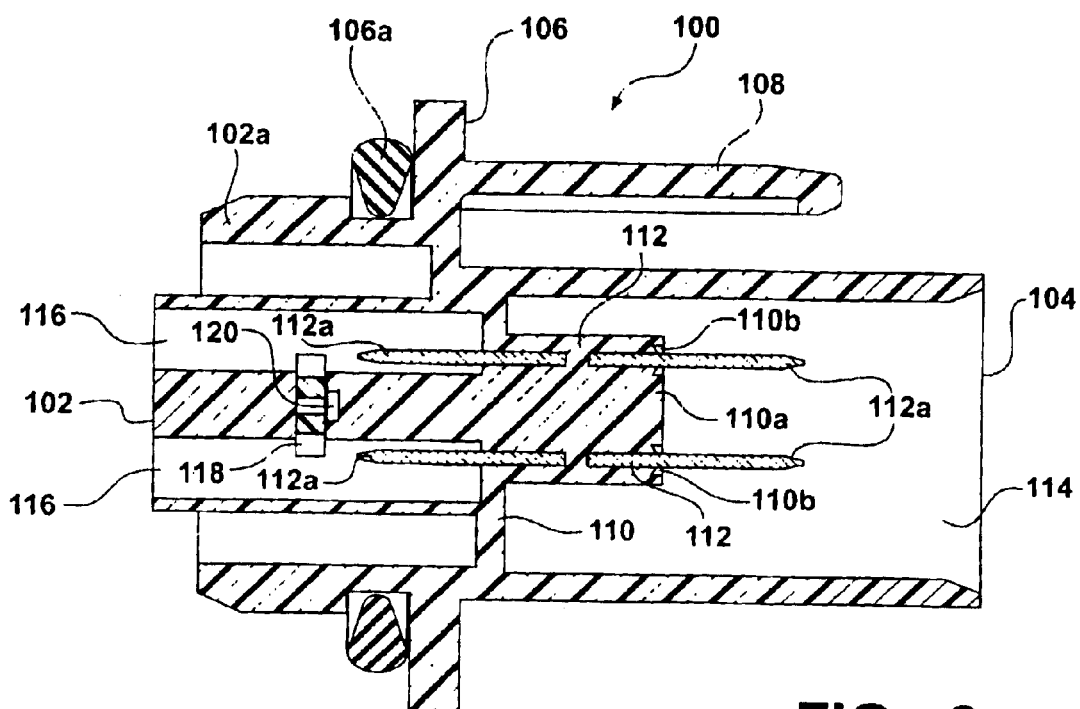
FIG. 2 is a side elevation view, in section, of an exemplary bulkhead connector and terminal mounting arrangement according to the invention.

Referring to FIG. 2, a detailed example of a bulkhead connector according to the invention is generally referred to at 100, with a one-piece molded plastic body having a wire-receiving end 102 designed for insertion through an aperture in the wall of a sealed chamber, a connector-receiving end 104, and a collar 106 to limit insertion of end 102 into the vacuum side of the chamber and to provide a seal with the wall of the chamber. Insertion end 102 has a plug portion 102a chamfered and sized to fit closely through an aperture in the sealed wall of the chamber into which the connector is inserted, and optionally tabs or lugs 102b (FIG. 3) to lockingly cooperate with locking structure on the sealed chamber side of the wall and/or to retain an airtight sealing gasket 106a on end 102 prior to insertion. The opening in the sealed wall may be sized or shaped to accommodate lugs 102b in known manner. Collar 106 is larger than the opening in the sealed wall, and with lugs 102b compresses the gasket 106a against the wall for an airtight seal when end 102 is fully inserted and locked in place.

Connector receiving end 104 is adapted to receive a mating connector of known type housing a plurality of terminated female wires of known type in known manner (see FIG. 1) and to lock that mating connector and its terminals in place with locking structure, for example an axial locking arm 108 designed to engage mating locking structure on the mating connector.

Connector 100 is internally divided and sealed in airtight fashion by an integrally molded partition or bulkhead 110, in the illustrated embodiment having a thickened, blocklike portion 110a in which intermediate portions of solid metal electrical terminals 112 are embedded by a known molding process such as insert-molding. Male ends 112a of the terminals extend from the bulkhead into the terminal chamber portions 114, 116 of connector ends 104 and 102 to receive female terminals.

An orthogonal terminal locking aperture/passage 120 is formed in connector end 102 on the sealed chamber side of gasket 106a. A terminal locking member 118 is retained in aperture 120 in a pre-lock condition allowing the axial insertion of individual female-terminated wires into mating engagement with terminal ends 112a in terminal chambers 116

Figure 3:
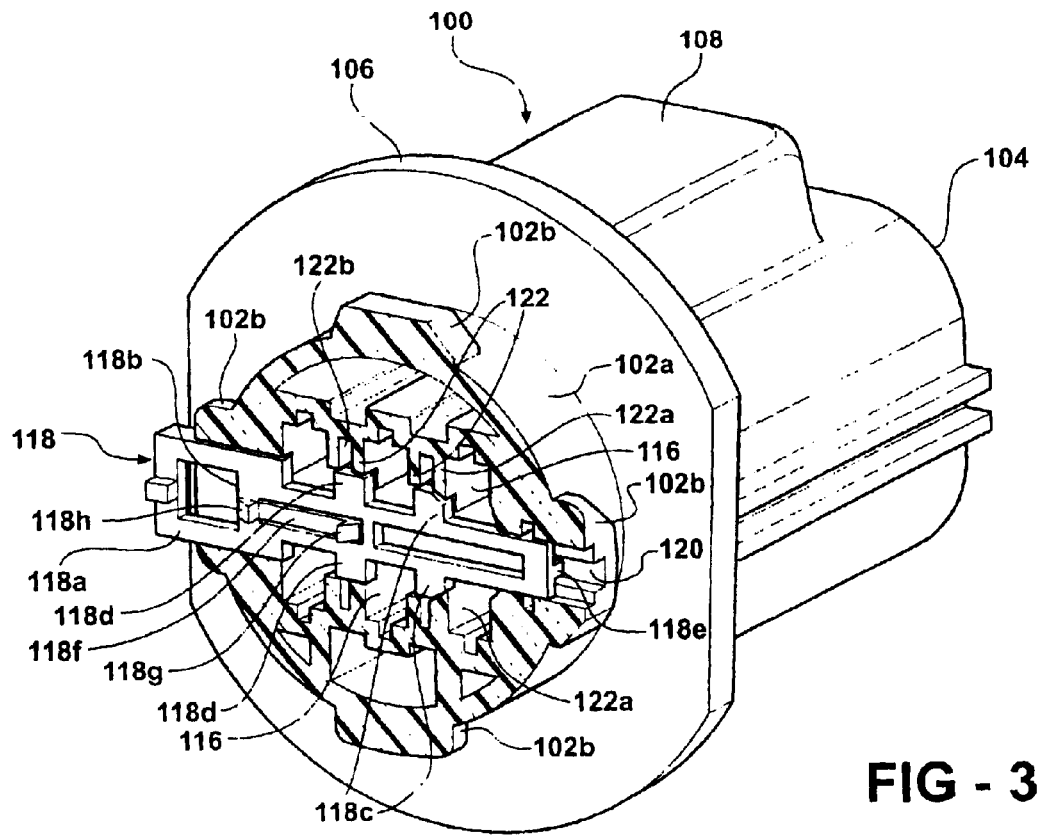
FIG. 3 is a perspective view of the sealed-chamber end of the connector of FIG. 2, with the terminal-receiving chamber portion sectioned to illustrate a pre-lock position of a terminal locking member.
Figure 3A:
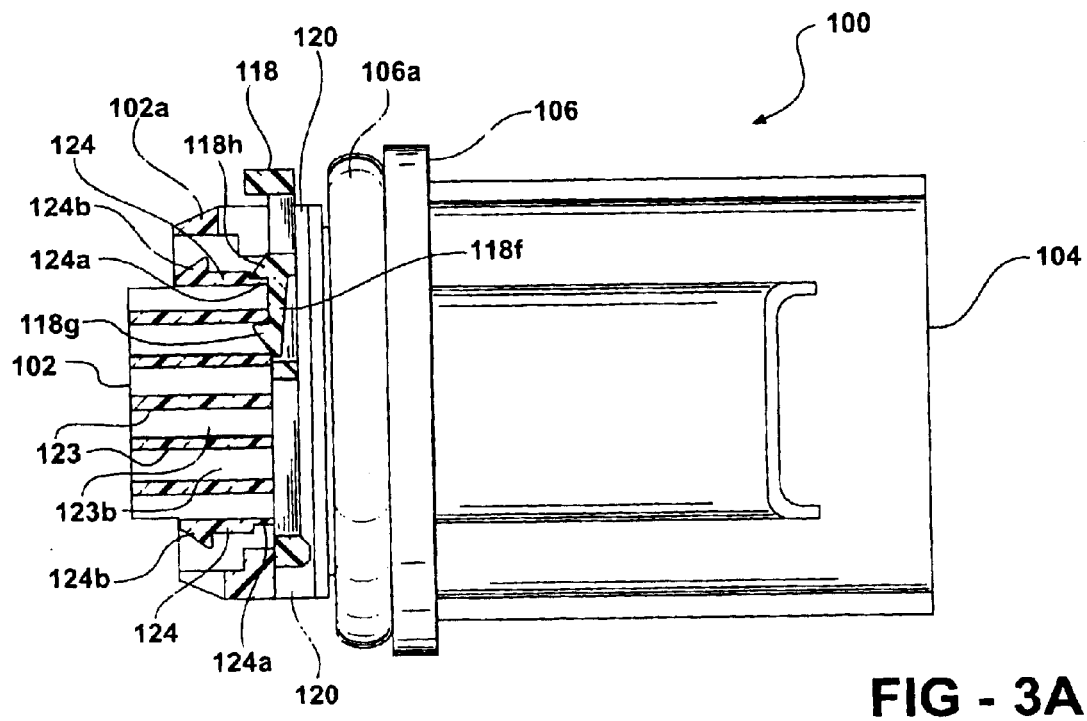
FIG. 3A is a top view, in partial section, of the pre-lock condition of FIG. 3.
Figure 5:
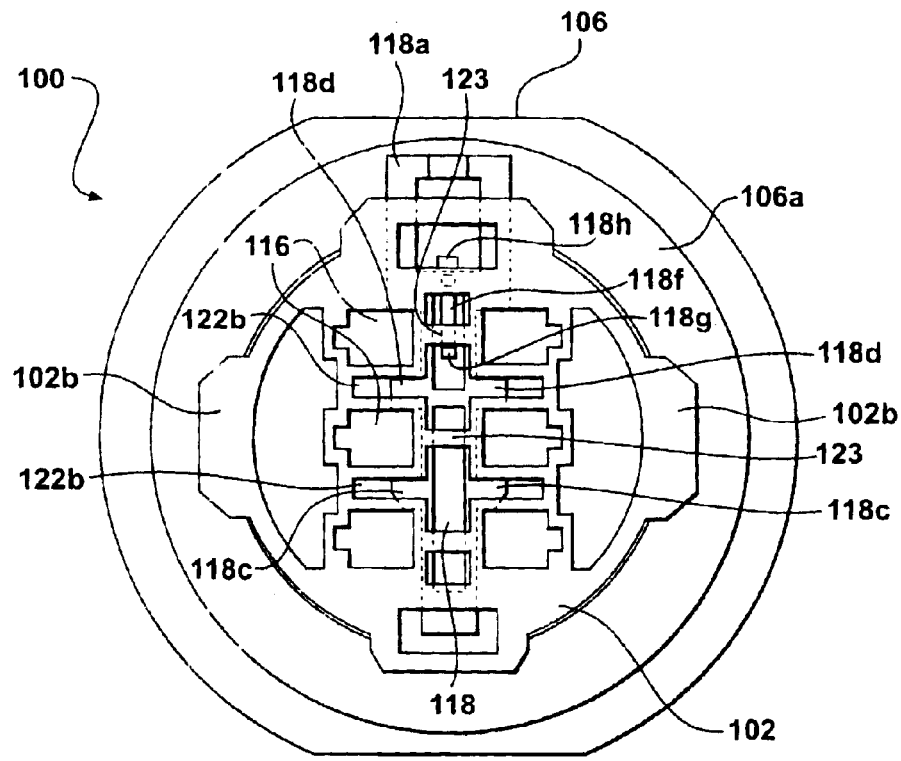
FIG. 5 is an elevation view of the sealed-chamber end of the connector of FIG. 2, with the terminal-locking member in the pre-lock position.

Referring next to FIGS. 3, 3A, and 5, connector end 102 is shown partially sectioned through the locking aperture 120 to better illustrate the pre-lock position of locking member 118 relative to terminal chambers 116. Locking member 118 is illustrated in a preferred key-like form having a finger or operating tab 118a with an aperture 118b designed to assist in grasping or operating it with fingers or a tool, and an elongated shank portion extending from tab 118a and supporting sets of locking tabs 118c and 118d, an end guide or spacer projection 118e, and a resilient axial locking finger 118f. Locking member 118 is formed from a suitable plastic material, for example molded from a nylon or polypropylene of the type often used for connector and terminal position assurance members used in the automotive connector art. When inserted into aperture 120 as shown in FIGS. 3, 3A and 5, forward locking tabs 118c slide past terminal chamber wall portions 122 until they abut longer wall portions 122a partway through the aperture. At the same time the forward barb 118g on axial locking finger 118f snaps over one of the wall portions 123 overlying aperture 120 on the front end of connector end 102 (FIGS. 3A and 5), and an angled stop 118h on tab 118a at the base of finger 118f abuts an inner end 124a of plug portion sidewall 124 near the insertion end of the aperture. Substantial resistance is then felt by the person inserting member 118, preferably accompanied by a tactile indication that the pre-lock condition has been reached. Once in the pre-lock condition, force sufficient to overcome the interference between tabs 118c and wall portions 122a and between stop 118h and wall portion 124a is required to move locking member 118 further into aperture 120 to the locked condition. Likewise, force is required to withdraw member 118 from the pre-locked condition against the interference between the forward end 118g of finger 118f and the corresponding wall portion 123.

As best shown in the end view of FIG. 5, locking tabs 118c and 118d in the pre-lock position are clear of the terminal chambers 116, allowing female terminals to be inserted.

Figure 4:
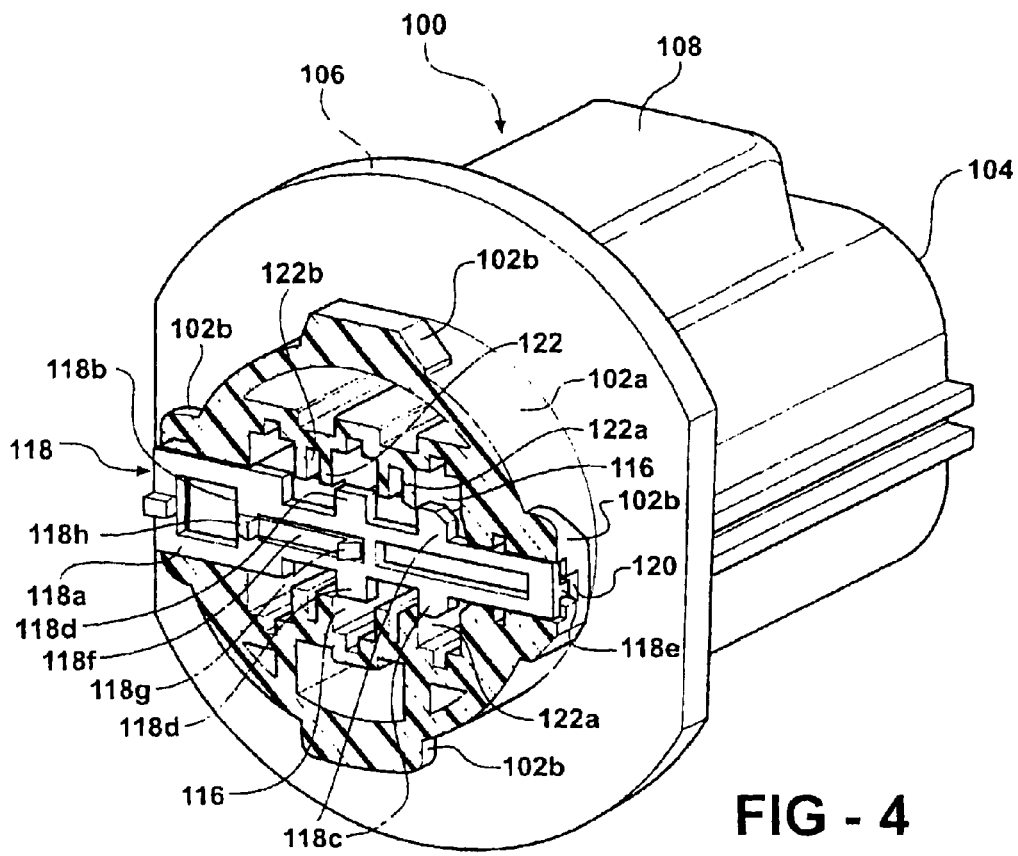
FIG. 4 is similar to FIG. 3, but with the terminal-locking member shown in its full-lock position.
Figure 4A:
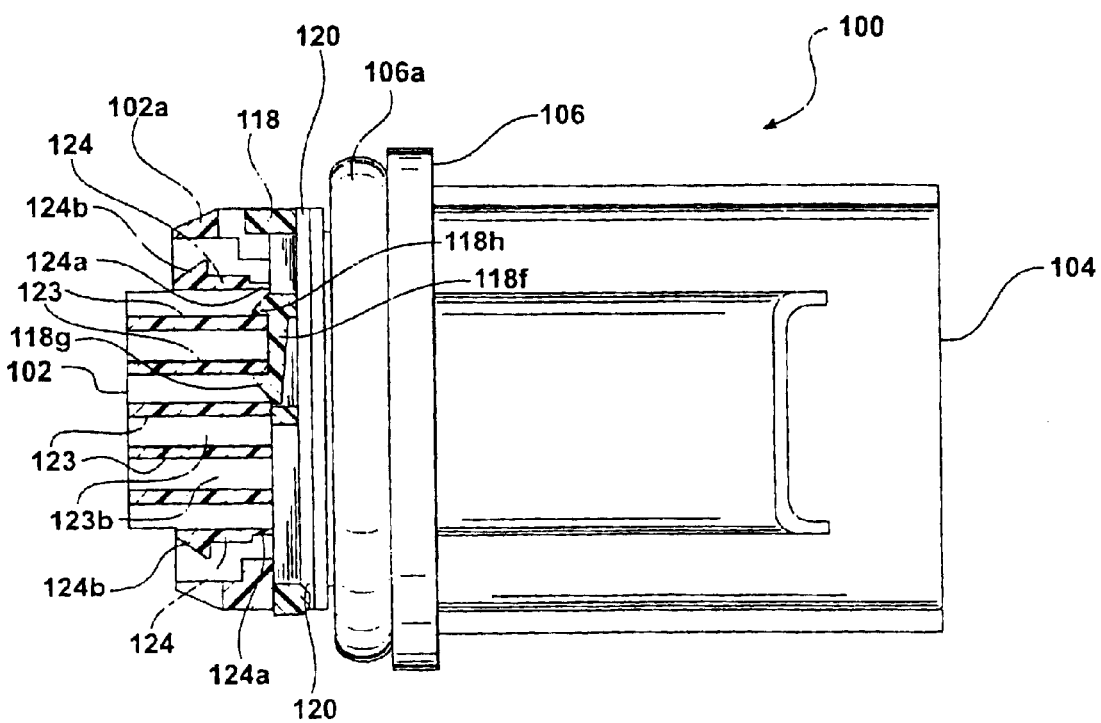
FIG. 4A is a top view, in partial section, of the full-lock condition of FIG. 4.
Figure 5A:
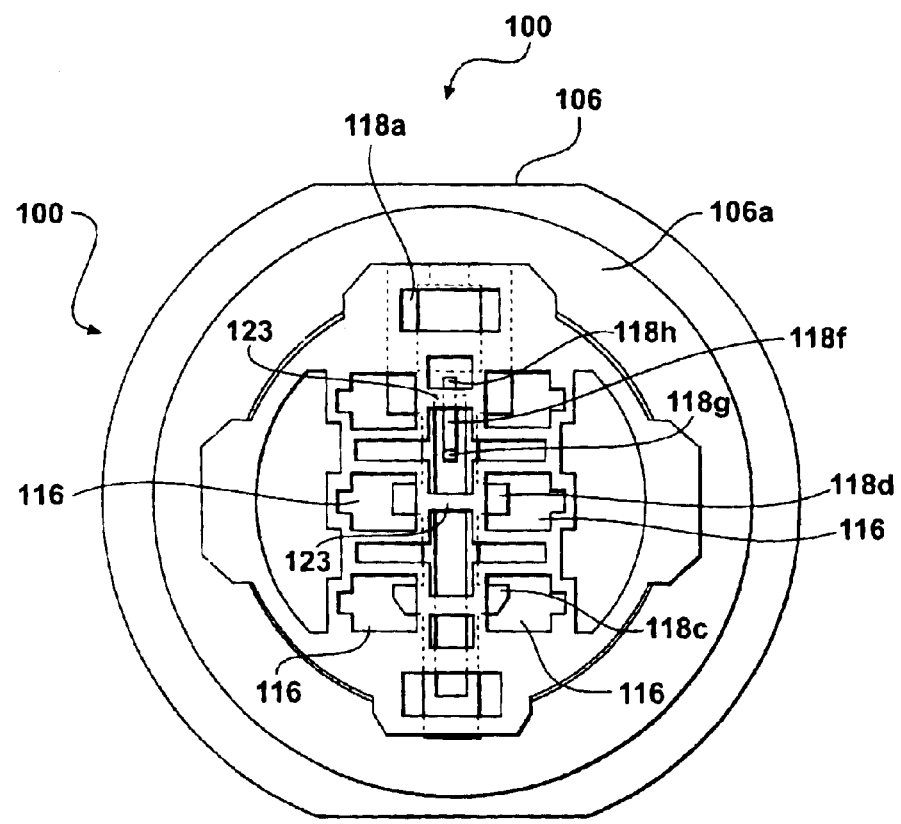
FIG. 5A is similar to FIG. 5, but shows the terminal-locking member in the full-lock position.

Referring next to FIGS. 4, 4A, and 5A, locking member 118 is shown moved to the full locked condition, in which locking tabs 118c and 118d and portions of tab 118a have been moved to their forwardmost positions overlying the portions of terminal chambers 116 that house the female terminals once they are mated with male terminals 112, i.e. overlying the rear ends of the fully inserted female terminals. It will be understood by those skilled in the art that the inserted terminals therefore cannot be pulled or vibrated out of engagement with terminals 112, ensuring a positive electrical connection. The locked condition is also characterized by a withdrawal-resistant interference between the rear, flat surfaces of locking tabs 118c against the longer wall portions 122a, a similar interference between forward end 118g of axial finger 118f and a second of the wall portions 123, and a positive insertion-halting abutment between stop 118h of the axial finger and the first of wall portions 123 it encounters. Whereas stop 118h can be forced past the thinner, flexible inner end 124a of plug portion sidewall 124, the thicker, stiffer wall portion 123 prevents further insertion.

It will be noticed in the locked condition of FIGS. 4 and 4A that operating tab 118a is recessed into plug portion 102. This prevents the fully-locked member 118 from interfering with the insertion of connector end 102 into the aperture in the wall of the sealed chamber, and also protects locking member 118 from unintentional release. Locking member 118 can be intentionally released with a tool inserted between wall portions 123 into aperture 120 from the open terminal insertion end of the connector to release barb 118g and simultaneously pulling member 118 outwardly with sufficient force to overcome the interference between forward locking tabs 118c and elongated wall portions 122a.

Figure 6:
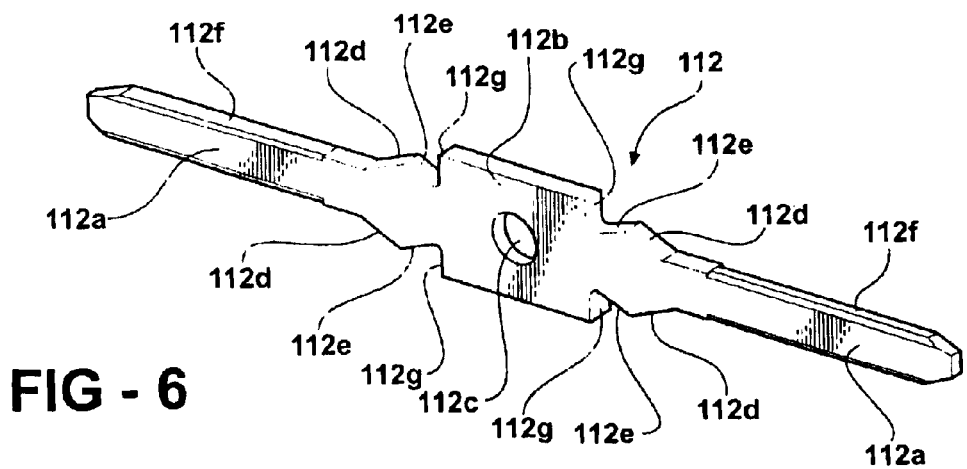
FIG. 6 is a perspective view of one of the embedded male terminals from the connector of FIG. 2, according to another aspect of the invention.
Figure 6A:
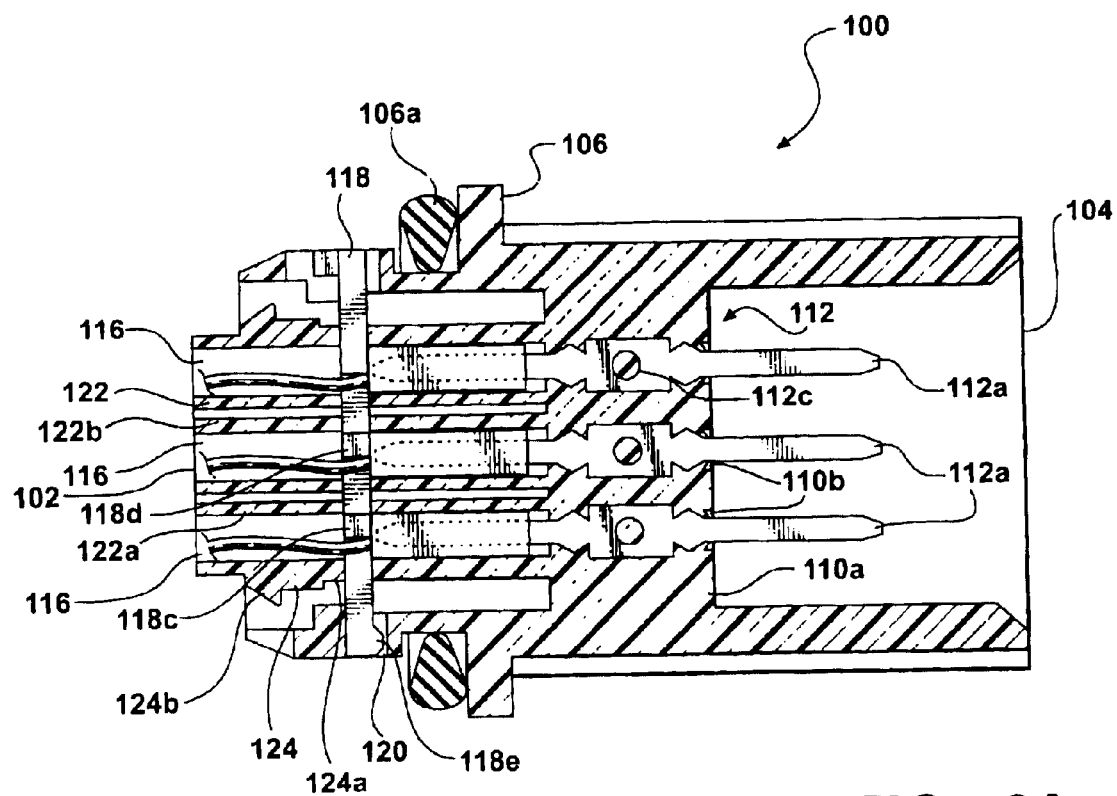
FIG. 6A is a side elevation view of the connector of FIG. 2, sectioned through a set of the terminal chambers to illustrate the embedded terminals as shown in FIG. 6.

Referring next to FIGS. 6 and 6A, a preferred example of male embedded terminal 112 is shown in detail. Since wire-receiving end 102 of connector 100 is unsealed, the interface between embedded terminals 112 and connector bulkhead 110 must be airtight. It is accordingly desirable to supplement the plastic-to-metal interface with a sealant of known type, for example using the method of forcing a suitable Loctite™ brand sealant into recesses or pockets 110b formed where the ends of terminals 112 exit bulkhead portion 110a.

Illustrated terminal 112 is designed to prevent sealant from shooting through small gaps or crevices left by the molding process between the plastic of the bulkhead and the metal of the terminal in a manner that leaves these gaps or crevices unsealed. Terminal 112 has a central body portion 112b having a height greater than that of the rest of the flat, blade-type terminal. A hole 112c in body 112b assists in securing the terminal in the bulkhead by letting plastic from the bulkhead flow through and harden in the hole during the molding process. An alternating high/low pattern of angled flats 112d, 112e are formed on the upper and lower edges 112f of each male portion 112a near the body portion 112b, forming a zigzag or tooth-like pattern. In the illustrated embodiment a single "tooth" or raised point is formed on each edge 112f, but it will be understood that multiple series of teeth or raised portions can be applied to the edges.

If sealant shoot-through under centrifugal or other force is going to occur due to gaps left by the molding process, edges 112f are the most likely surfaces to have such gaps and to channel sealant from the outer ends 112a of the terminals through the bulkhead. The alternating high/low surfaces 112d and 112e, backed by the perpendicular raised shoulders 112g of central body portion 112b, serve to slow and accumulate any sealant shooting through along edges 112f, thereby allowing the sealant to fill any gaps between the metal terminal and plastic bulkhead.

It will be understood that the foregoing preferred examples are not intended to limit the invention but rather to explain the invention in a clear manner that may nevertheless be subject to modification by those skilled in the art now that we have made our invention known by these examples, without departing from the scope of the invention as defined in the following claims.

We accordingly claim:

1. A vehicle wire harness type electrical connector for connecting terminated wires through a wall separating a sealed chamber from an ambient atmosphere in airtight fashion, comprising:

a connector having an insertion end adapted to be inserted from the ambient side of the wall through an aperture in the wall into the sealed chamber, an external seal for sealing the connector in airtight fashion to the ambient side of the wall, a connector-mating end adapted to remain on the ambient side of the wall to matingly receive a terminated-wire connector, an internal bulkhead separating the insertion end from the connector-mating end, and a plurality of solid male terminals extending through the bulkhead in airtight fashion with male terminal ends exposed in the insertion end and in the connector-mating end, wherein the insertion end of the connector has a plurality of terminal chambers adapted to receive individual terminated wires and guide the terminated wires into connection with the exposed male terminal ends on the insertion end of the bulkhead, the insertion end further including an orthogonal locking member stored in the insertion end in an orthogonal aperture running through the terminal chambers behind the connection of the terminated wires with the male terminal ends, the locking member being stored in a pre-lock position in which the terminated wires are free to pass the locking member into connection with the male terminal ends, the locking member being movable in the aperture from the pre-lock position to a full-lock position in which the locking member prevents withdrawal of the terminated wires from the connection with the male terminal ends.

2. The connector of claim 1, wherein the locking member has spaced projections that are out of alignment with the terminal chambers in the pre-lock position, and in alignment with the terminal chambers in the full-lock position.

3. The connector of claim 1, wherein the locking member has an operating tab projecting radially from the insertion end of the connector in the pre-lock position, and being recessed in the insertion end in the full-lock position.

4. The connector of claim 1, wherein the male terminals include sealant accumulating surfaces embedded in the bulkhead for collecting sealant forced between the bulkhead and the male terminals.

5. The connector of claim 4, wherein the male terminals are blade type terminals with upper and lower edges, and the sealant accumulating surfaces are located on the upper and lower edges.

6. The connector of claim 5, wherein the sealant accumulating surfaces comprise alternating high and low surfaces.

7. The connector of claim 6, wherein the male terminals have middle portions that extend above and below the upper and lower edges.

8. The connector of claim 7, wherein the middle portions of the male terminals present perpendicular edges to the upper and lower edges adjacent the sealant accumulating surfaces.

9. A vehicle wire harness type electrical connector system for connecting terminated wires through a wall separating a sealed chamber from an ambient atmosphere in airtight fashion, comprising:

a bulkhead connector passing through the wall and having an external airtight seal to the wall on the ambient side, an insertion end inserted through an aperture in the wall and residing in the sealed chamber, a plurality of individual female-terminated wires inserted in the insertion end of the connector, the insertion end of the bulkhead connector including an orthogonal locking member stored in an orthogonal aperture in the insertion end in a pre-lock condition allowing the female terminated wires to be mated to the male terminals, and movable from the pre-lock position to a full-lock position preventing withdrawal of the female-terminated wires from the male terminals, a connector-mating end residing on the ambient side of the wall, a female connector mated with the connector-mating end, the bulkhead connector having an internal bulkhead through which solid male terminals pass in airtight fashion to connect the female-terminated wires in the insertion end to terminals in the female connector.

10. The connector system of claim 9, wherein the insertion end of the bulkhead connector is unsealed, and wherein the male terminals include sealant accumulating surfaces embedded in the bulkhead.

11. In a vehicle wire harness type electrical connector for connecting terminated wires through a wall separating a sealed chamber from an ambient atmosphere in airtight fashion, the connector having solid metal male terminals embedded in an internal plastic bulkhead, a male terminal comprising:

an intermediate portion embedded in the plastic of the bulkhead, and terminal ends projecting from each side of the bulkhead, the intermediate portion having sealant accumulating surfaces embedded in the bulkhead along terminal surfaces likely to channel sealant forced between the bulkhead and the metal of the terminal during a post-molding sealing process, the sealant accumulating surfaces of the intermediate portion of the terminal comprising alternating angled surfaces.

12. The terminal of claim 11, wherein the sealant alternating angled surfaces form a tooth-like pattern.

13. The terminal of claim 11, wherein the intermediate portion includes an enlarged middle portion extending higher than the sealant accumulating surfaces.

* * * * *